United States Patent
Smith

(10) Patent No.: US 7,166,210 B2
(45) Date of Patent: Jan. 23, 2007

(54) OIL FILTER CARTRIDGE

(75) Inventor: Ellis Junior Smith, Martinez, GA (US)

(73) Assignee: Deere & Company, Moline, IL (US)

( * ) Notice: Subject to any disclaimer, the term of this patent is extended or adjusted under 35 U.S.C. 154(b) by 13 days.

(21) Appl. No.: 10/372,602

(22) Filed: Feb. 21, 2003

(65) Prior Publication Data

US 2004/0164008 A1  Aug. 26, 2004

(51) Int. Cl.
*B01D 35/147* (2006.01)

(52) U.S. Cl. .................... 210/132; 210/497.01

(58) Field of Classification Search .............. 210/130, 210/132, 168, 171, 172, 430, 454, 450–452, 210/453, 455, 493.2, 497.01; 74/467; 475/159, 475/166; 184/6.24, 106
See application file for complete search history.

(56) References Cited

U.S. PATENT DOCUMENTS

| | | | | |
|---|---|---|---|---|
| 3,056,501 A | * | 10/1962 | Thorman | 210/132 |
| 3,282,428 A | * | 11/1966 | Rosaen | 210/132 |
| 3,288,291 A | * | 11/1966 | Rosaen | 210/90 |
| 3,469,697 A | | 9/1969 | Kudlaty | 210/132 |
| 3,970,566 A | * | 7/1976 | Rosaen | 210/452 |
| 4,126,553 A | * | 11/1978 | Berg | 210/130 |
| 4,222,875 A | | 9/1980 | Sikula, Jr. | 210/235 |
| 4,299,696 A | * | 11/1981 | Rosaen et al. | 210/120 |
| 4,343,697 A | | 8/1982 | Miller et al. | 210/90 |
| 4,348,864 A | * | 9/1982 | Ichimura et al. | 60/454 |
| 5,660,729 A | * | 8/1997 | Baumann | 210/457 |
| 5,858,227 A | * | 1/1999 | Stone et al. | 210/234 |
| 6,024,193 A | | 2/2000 | Fukushima | 184/6.28 |
| 6,241,038 B1 | * | 6/2001 | Young et al. | 180/53.8 |
| 6,464,863 B1 | * | 10/2002 | Nguyen | 210/168 |
| 2002/0170852 A1 | * | 11/2002 | Reinhardt | 210/132 |
| 2004/0031745 A1 | * | 2/2004 | Moessinger et al. | 210/323.2 |

FOREIGN PATENT DOCUMENTS

| | | | |
|---|---|---|---|
| DE | 2256436 A | * | 6/1974 |
| DE | 101 13 179 | | 9/2002 |
| EP | 0 937 868 | | 8/1999 |
| WO | WO 02/32543 | | 4/2002 |

OTHER PUBLICATIONS

Deere & Company, Parts Catalog for 4310 Compact Utility Tractor, one page, date of publication— Jan. 2002, published in U.S.A.

* cited by examiner

*Primary Examiner*—Matthew O. Savage

(57) ABSTRACT

The present invention relates to small vehicles such as lawn and garden tractors and more specifically to an oil filter cartridge or assembly usable with the transmissions of such vehicles. The cartridge is comprised of a filtering element, a strainer element and a by-pass valve. The by-pass valve is housed within the strainer element and is adapted to direct oil flow through the strainer element, but not the filter element when the oil viscosity is high and only through the filter element when the oil viscosity is low. In this way, the parasitic horsepower loss caused by routing oil through the strainer element at all times is eliminated. The cartridge is also housed within the transmission case to reduce mounting bracketry outside the transmission case and minimize the likelihood of insufficient oil supply available for the filter, pump and hydraulic system functions.

8 Claims, 4 Drawing Sheets

OIL FILTER CARTRIDGE

CROSS REFERENCE TO RELATED APPLICATIONS

Two commonly owned and related patent applications have been filed concurrently with this patent application on Feb. 21, 2003, and their disclosures are intended to be fully incorporated by reference herein. They include "Tank Mounted Oil Filter Assembly", Ser. No. 10/372,753, now U.S. Pat. No. 7,056,432, and "Fluid Line Locking Structure", Ser. No. 10/372,752, now U.S. Pat. No. 6,871,883.

FIELD OF THE INVENTION

The present invention relates to vehicles such as utility tractors and more specifically, to a disposable hydraulic oil filter/strainer assembly which can be housed within the oil reservoir of the transmission and quickly and easily be removed and replaced.

BACKGROUND OF THE INVENTION

Small vehicles such as utility tractors utilize transmissions such as hydrostatic and clutch driven units. These transmissions rely upon hydraulic oil pumps to circulate the fluid from a reservoir located within the transmission case, through filtering elements to the pump and then back to the transmission and fluid reservoir. Typically the hydraulic fluid reservoirs are provided within the transmission case itself.

Since the hydraulic fluid becomes contaminated with both larger and smaller particles over time as it is used, the hydraulic fluid is passed through strainers to remove the larger contaminates and filters to remove the smaller contaminates.

In vehicles such as those used in the present application, the filters are typically designed to remove contaminates having sizes up to approximately five microns and larger, while the strainers are typically designed to remove contaminates having sizes in the 60 micron and larger range.

Present hydrostatic fluid systems on these vehicles provide for separate strainers and filters to be plumbed in series with the strainers provided upstream of the filter. A bypass valve is then located between the strainer and filter to direct the hydraulic fluid around the filter when the hydraulic fluid is cold, as will be the case during initial startup periods. During those times, the viscosity of the oil can be so high that the vacuum generated by the pump can cause the filter to collapse or be damaged and/or the pump to be damaged. Therefore, the bypass valve serves to direct the hydraulic fluid around the filter until the viscosity drops and the pump suction pressure drops to levels which are safe enough for the filter to handle.

Because the strainers and filters are plumbed in series, the hydraulic pump operates to pull fluid through the strainer at all times, even after the oil is warm and the viscosity is low. Accordingly, the hydraulic system loses some of its horsepower capability when it must constantly pull the fluid through the strainer. It would, therefore, be desirable to eliminate this parasitic horsepower loss caused by the need to always pull the hydraulic fluid through the strainer.

An additional problem presented in current hydraulic fluid systems on present vehicles relates to the plumbing arrangement. Since the filter elements need to be periodically changed when they become full of contaminates, and since the strainer elements need to be periodically cleaned or changed as they fill up, both elements are housed in plumbing outside of and adjacent to the transmission case to provide easier access to them. Locating them outside of and/or adjacent to the transmission case takes up precious space that could be used for other transmission, engine and/or vehicle components. Since these areas are generally crowded with such components, access to the filter and strainers can sometimes be difficult. Accordingly, it would also be desirable to minimize the space allocated to these filter strainer components adjacent the transmission case as well as provide a combination filter/strainer design that would allow easy access for changing and/or cleaning of the filter and/or strainer elements.

Another problem sometimes experienced with the location of the filter and strainer in these hydraulic systems relates to their location relative to the hydraulic reservoir. When they are not located so as to assure a constant supply of hydraulic fluid, air can be drawn into the hydraulic lines and cause the pump to cavitate. Therefore, it would be desirable to place the filter/strainer assembly within the hydraulic reservoir to assure that a constant supply of hydraulic fluid is present in the lines of the system.

SUMMARY OF THE INVENTION

It would therefore be desirable to provide a hydraulic fluid system for utility tractors and similar vehicles which would minimize the piping and bracketry required to mount the filter and strainer outside of and adjacent the transmission case and its fluid reservoir, reduce the leak paths associated with plumbing joints required to house the filters and strainers in series and minimize the space required adjacent to the transmission case to mount and access the filter and strainer components. It would also be desirable to provide a design which would eliminate the parasitic horsepower loss caused by pulling hydraulic fluid through the strainer at all times.

Towards these ends, there is provided a disposable filter and strainer assembly with the bypass valve built into the strainer. This assembly utilizes a minimal amount of metal and is therefore incinerable. The bypass valve operates to direct hydraulic oil around the filter and through the strainer only when the oil viscosity is high. The valve then closes when the viscosity has been reduced to an acceptable level, allowing the oil to be pulled through the filter only. The parasitic horsepower loss found in many present hydraulic systems utilizing series plumbing is thereby eliminated with the present invention.

The disposable filter is further located in a specially constructed housing within the transmission case so that it is immersed within the hydraulic fluid at all times. In this way the filter and strainer are better assured a constant supply of hydraulic fluid to minimize the likelihood that pump cavitation and/or starvation will occur. Additionally, the space required adjacent to the transmission to house the filter and strainer assembly is minimized.

With the present invention there is provided a filter/strainer assembly which minimizes the piping, bracketry and space required to mount the filter strainer cartridge, makes access to it for servicing easier, better assures that the filter strainer has a constant supply of hydraulic fluid and eliminates the parasitic horsepower loss in the system caused by the need to always pull fluid through the strainer.

BRIEF DESCRIPTION OF THE DRAWINGS

FIG. 3 is an enlarged perspective view of the oil filter assembly with a portion cut away to illustrate the internal components.

DESCRIPTION OF THE PREFERRED EMBODIMENT

Figure 1:
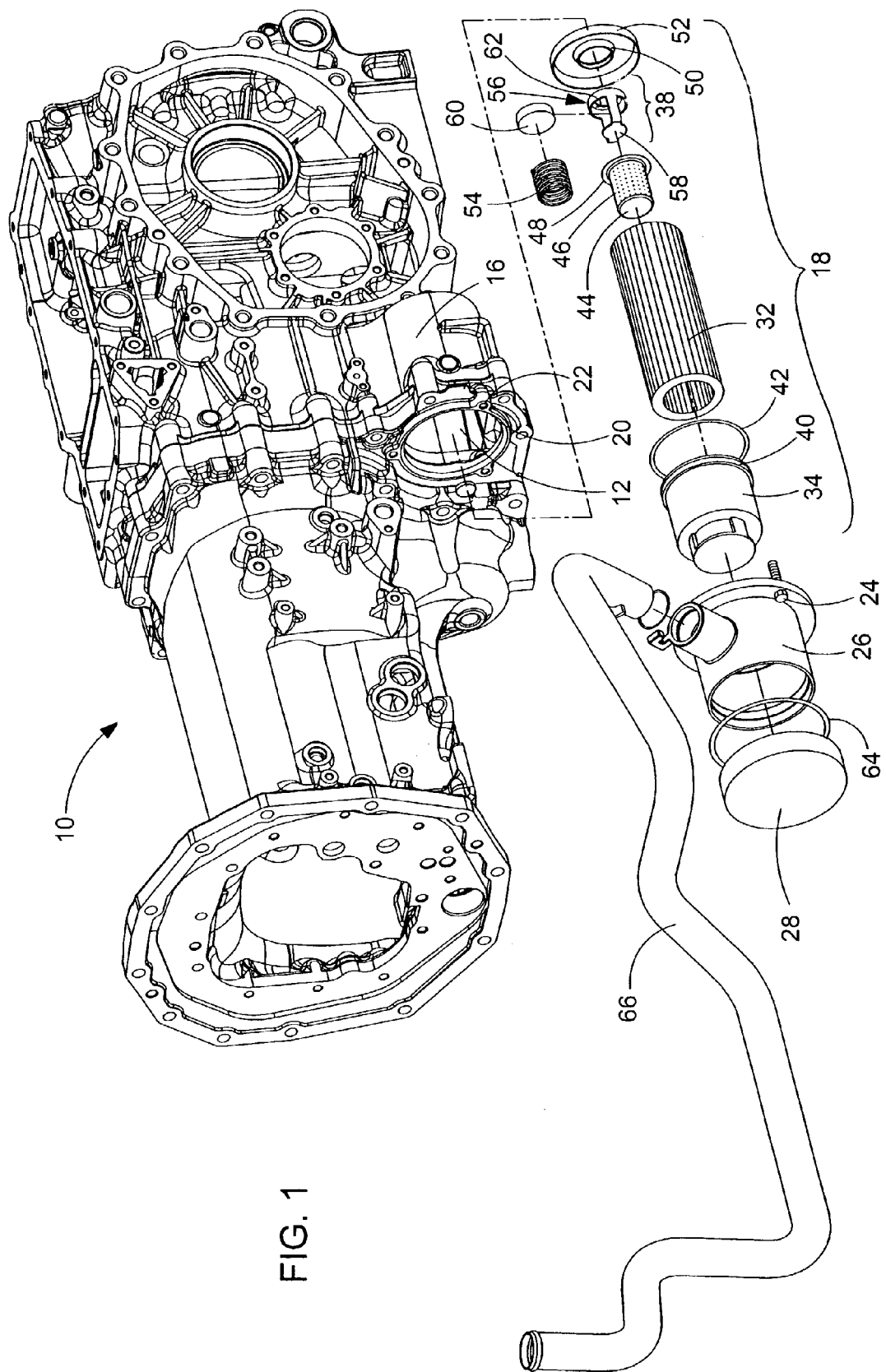
FIG. 1 is an elevated perspective view of the transmission case with an exploded perspective view of the oil filter assembly.

Looking first to FIG. 1, there is illustrated a transmission case 10 that houses the various components of a transmission as well as the oil reservoir 12 for the hydraulic fluid used by the transmission and the various hydraulic system functions 14 of the vehicle. Looking as well to FIG. 2, it can be seen that the transmission case 10 includes a housing 16 for the oil filter assembly 18 in the lower rear side of the case 10. This housing 16 is located so that the oil filter assembly 18 is immersed within the oil reservoir 12 contained in the lower portion of the transmission case 10. The opening 20 to the housing 16 is generally circular and provided with holes 22 for receiving bolts or similar fasteners 24.

Figure 2:
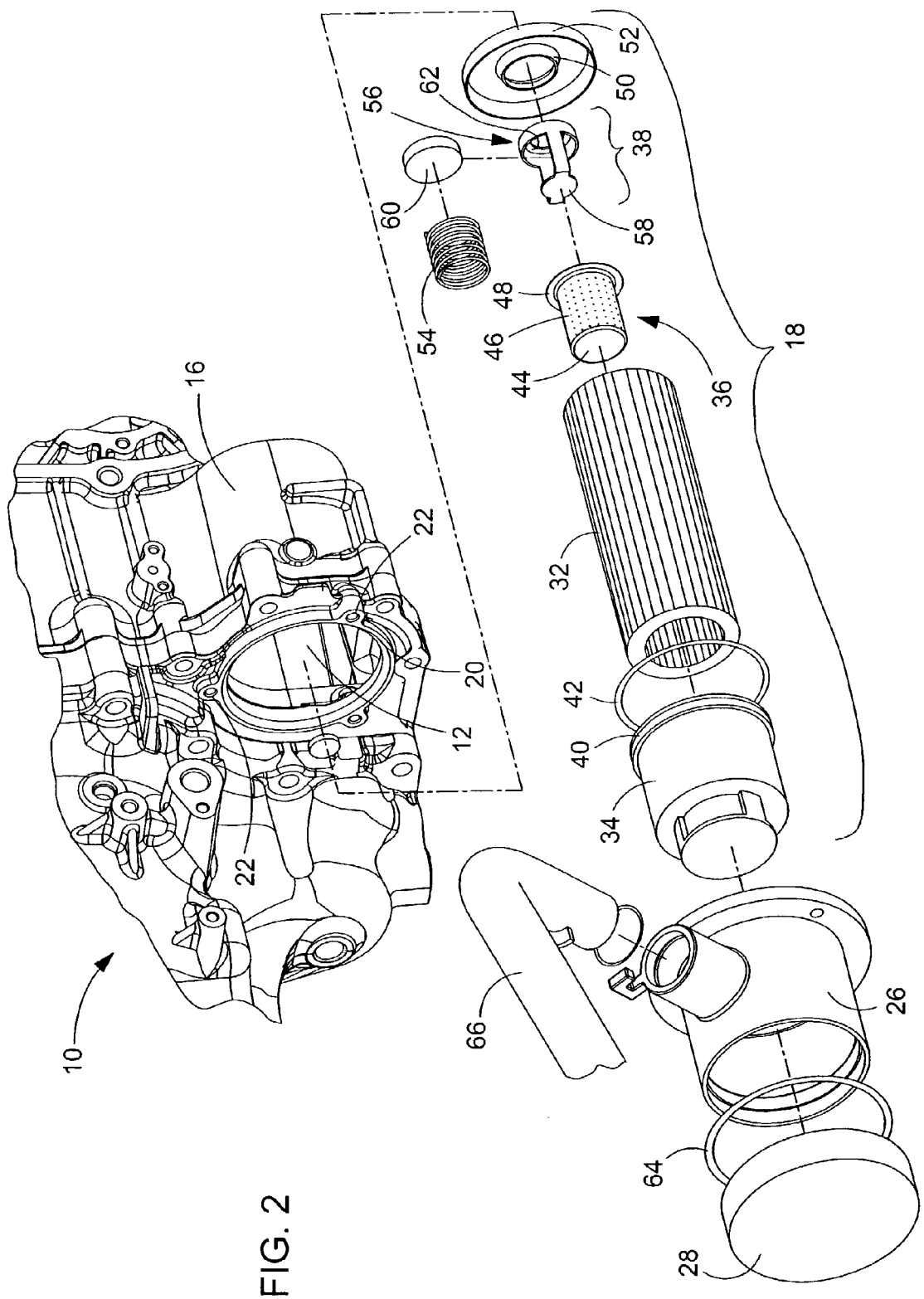
FIG. 2 is an enlarged perspective exploded view of the oil filter assembly components.
Figure 3A:
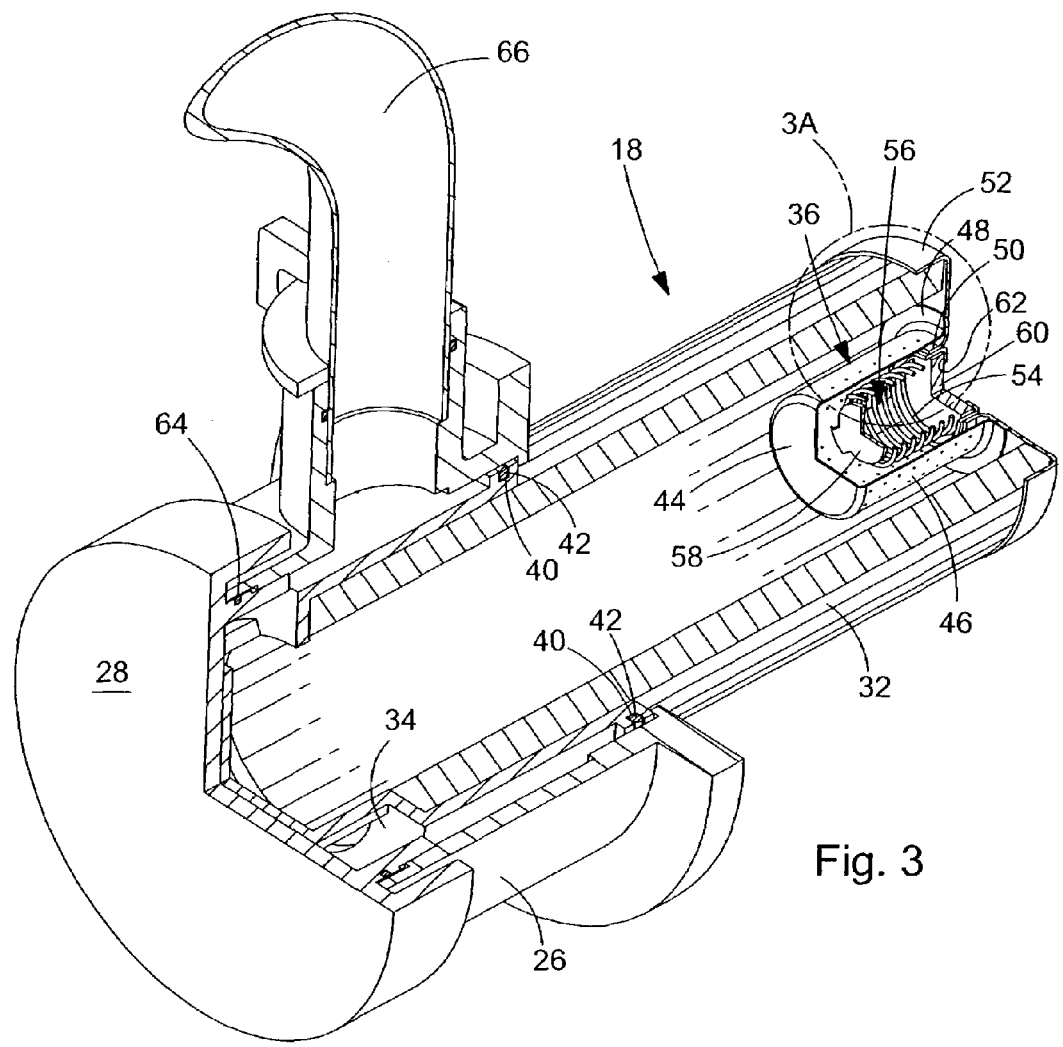
FIG. 3a is a further enlarged view of the structure which secures the by-pass valve in the end portion of the filter assembly.
Figure 3A:
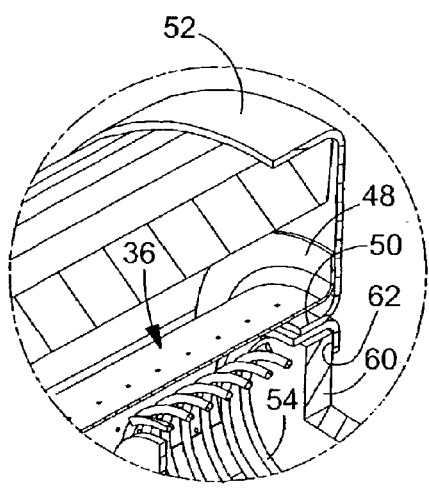

Receivable within the oil filter housing 16 is the combination hydraulic oil filter/strainer/bypass-valve assembly 18 shown in an exploded fashion in both FIGS. 1 and 2. A cutaway view of this assembly 18 is shown in FIG. 3 as it is supported by a cast filter head 26. The cast head 26 is removably secured to the transmission case 10 by the bolts 24 that are receivable in the threaded holes 22 in the case 10. The head 26 is adapted to threadably receive a removable access or end cap 28 to permit the filter assembly 18 to be easily installed therein and be supported in a cantilevered fashion in the reservoir 12 of the transmission case 10. The cap 28 also permits the filter assembly 18 to be quickly and easily removed so that a new assembly 18 can be installed.

Figure 4:
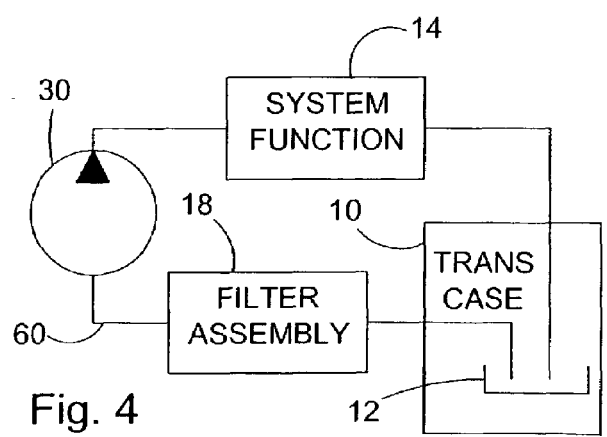
FIG. 4 is a schematic illustration of the hydraulic fluid system utilized with the oil filter assembly.

Referring now to FIG. 4, there is shown a fluid circuit which includes the reservoir 12 within the transmission case 10. A pump 30 is provided to move fluid from the reservoir 12, draw it through the filter assembly 18 and then move it on to the various system functions 14 provided on the vehicle before returning it to the reservoir 12.

Looking again to FIGS. 2 and 3, it will be seen that the filter assembly 18 is comprised of a filtering element 32 received within a cartridge head 34, a strainer element 36 received within the filtering element 32 and a bypass valve 38 housed within the strainer element 36. The cartridge head 34 is provided with a U-shaped channel 40 within which a dimetral or circumferential O-ring 42 is received. This O-ring 42 serves to assure a fluid tight connection between the cartridge head 34 and filter head 26 and also properly position the filter assembly 18 within the cast head 26.

The strainer element 36 is mounted within one end of the filter element 32 and is comprised of a strainer end wall 44 and an elongated strainer screen 46. The strainer screen 46 takes the form of a foraminous sleeve with a hollow bore. At one end of the strainer element 36 is carried a retainer ring 48. This ring 48 is preferably press fit within the opening formed by the shoulder 50 on the filter cartridge end cap 52, see FIGS. 1, 2 and 3a.

The by-pass valve 38 carried within the strainer element 36 includes a spring 54 which is carried within a spring housing 56. The housing 56 includes a spring retainer 58 at its one end against which the spring 54 abuts. The other end of the spring 54 abuts against a poppett 60 which in turn abuts against a seat 62 formed at the end of the spring housing 56.

When installed, the filter assembly 18 is supported within the cast head 26 and extends in a cantilevered fashion into the oil reservoir 12 within the transmission case 10. The cast head 26 is secured to the transmission case 10 by bolts 24 to properly locate the filter assembly 18 within the oil reservoir 12 inside the transmission case 10. The access or end cap 28 is threadably secured to the cast head 26. Another O-ring 64 is provided to seal the end cap 28 onto the cast head 26.

During operation, the hydraulic pump 30 serves to draw hydraulic oil from the reservoir 12 inside the transmission case 10 through the filtering assembly 18, out the suction outlet pipe 66 and to the pump 30. From the pump 30, the oil is then moved to the various system functions 14 and ultimately returned to the oil reservoir 12 inside the transmission case 10 where it is then available to service the components of the transmission during its operation.

When the tractor is first started and the hydraulic oil is cold, its viscosity will be greater and it will be thicker, heavier and more dense. As cold oil is drawn from the reservoir 12 by the pump 30, it tends to flow slowly and does not easily pass through the walls of the filter element 32. Further, larger particles of contaminates in the oil will not easily pass through the walls of the filter element 32. It is during this time that the high suction created by the pump 30 causes the poppett 60 of the bypass valve 38 to open and permit the cold oil to flow through it, through the strainer element 36 and back to the pump 30, see FIG. 5.

Figure 5:
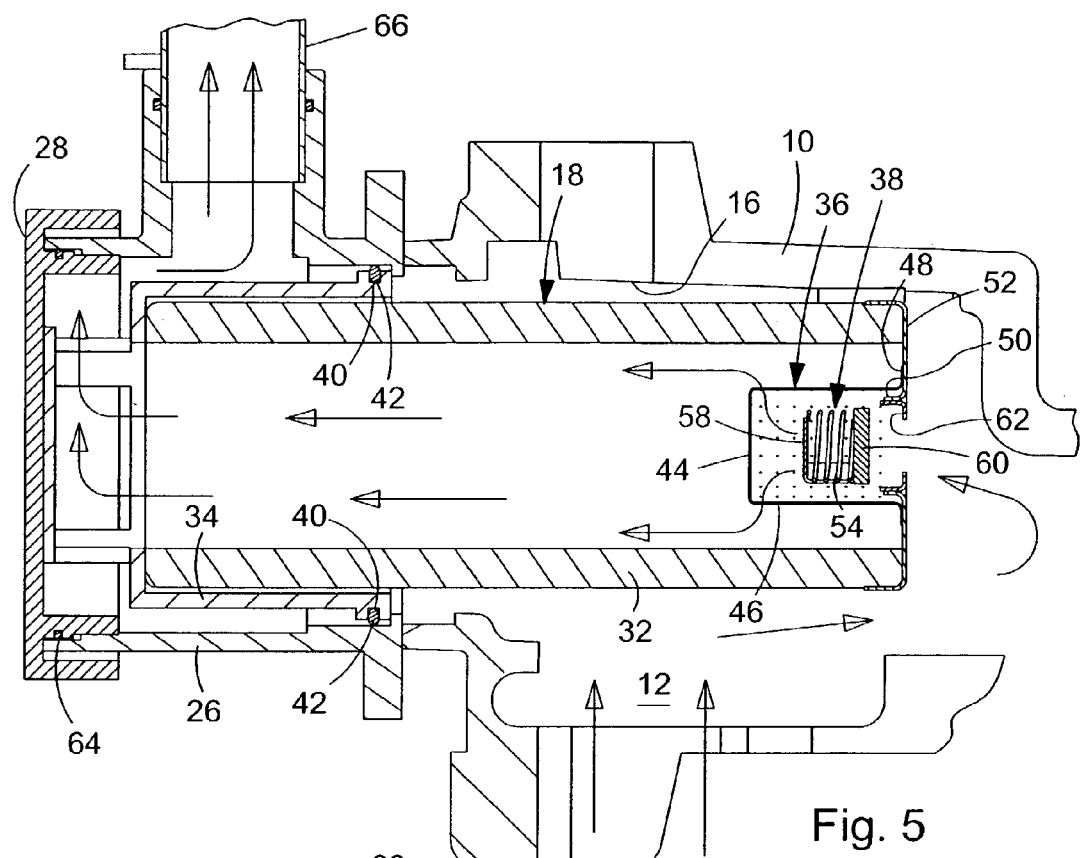
FIG. 5 is an enlarged side view of the oil filter assembly illustrating the hydraulic fluid flow during start-up when the oil viscosity is high and the flow is through the strainer and by-pass valve.

Looking still to FIG. 5 wherein arrows designate the flow path of the cold oil, it can be seen that the oil from the reservoir 12 in the filter housing 16 of the transmission case 10 that surrounds the filter assembly 18 flows around, but not through the filter element 32 since its viscosity is high. As the suction created by the pump 30 increases, the by-pass valve poppett 60 opens and permits the cold oil to flow through the strainer element 36, through the hollow bore of the filter element 32, out the end of the filter cartridge head 34 and through the suction pipe 66 to the pump 30. In the preferred embodiment, the by-pass valve 38 operates to direct oil to the inlet area of the strainer element 36 when the oil pressure is approximately five pounds per square inch of vacuum. The by-pass valve 38 thus serves to allow the cold oil to pass through the strainer element 36, but not the filter element 32.

Figure 6:
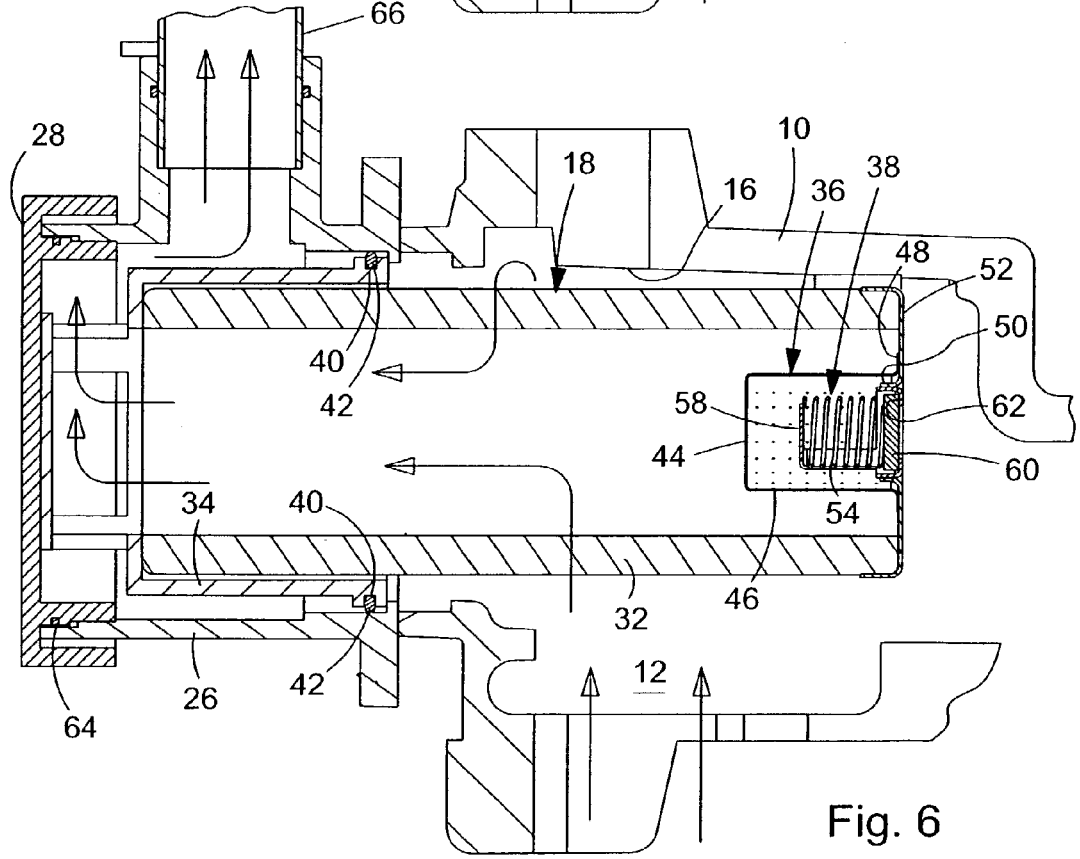
FIG. 6 is an enlarged side view of the oil filter assembly illustrating the hydraulic fluid flow during normal operation when the oil viscosity is low and the flow is through the filter.

When the oil has warmed sufficiently, its viscosity will drop and the suction created by the pump 30 will drop, allowing the poppett 60 of the by-pass valve 38 to close. As this occurs, the oil will begin to flow through the walls of the filter element 32. As illustrated by the arrows designating the fluid flow in FIG. 6, the oil will then be drawn through the walls of the filter element 32, along its hollow bore, out the end of the filter cartridge head 34 and through the suction pipe 66 to the pump 30. Thereafter, the pump 30 returns the oil to the reservoir 12 in the transmission case 10.

In the preferred embodiment, the by-pass valve 38 operates to direct oil to the inlet area of the filter element 32 when the oil pressure is below five pounds per square inch of vacuum. Further, the strainer element 36 in the preferred embodiment is designed to filter out contaminants found in the hydraulic fluid which have a particle size between 60 and 100 microns and the filtering element 32 is designed to filter out contaminants having a size of five microns and higher.

Since the filter cartridge assembly 18 is carried within the transmission case 10 in the filter housing 16 provided therein, the piping bracketry and space required to mount the filter assembly 18 is minimized, leaving room for other vehicle components. The threadably removable access end cap 28 facilitates simple access to the filter assembly 18 for service and maintenance. Since the filter assembly 18 is easily removed and replaced within the cast filter head 26, servicing is simpler. Locating the assembly 18 within the fluid reservoir 12 in the case 10 ensures that it is immersed in the oil and that cavitation and/or starvation of the pump 30 due to it drawing air is minimized.

Having described the preferred embodiment, it will become apparent that various modifications can be made without departing from the scope of the invention as defined in the accompanying claims.

The invention claimed is:

1. A disposable oil filter assembly comprising
a filtering element with a first end and a second end, an oil inlet area and an oil outlet area;
a strainer element received within the second end of the filtering element and having an oil inlet area operatively connected with the inlet area of the filtering element and an oil outlet area operatively connected with the oil outlet area of the filtering element;
a bypass valve housed within the strainer element and cooperating with the oil inlet areas of the filtering and strainer elements to selectively direct oil to the inlet area of either the filtering element or the strainer element; and
a cartridge head on the first end of the filter element supporting the filtering element in a cantilevered fashion so that the filtering element extends into and is immersed within an oil reservoir, a removable access cap configured to abut the cartridge head, a circumferential seal positioned on a radially outer surface of the cartridge head to provide a fluid-tight connection around the disposable filter assembly.

2. The invention defined in claim 1 wherein the bypass valve is a pressure responsive valve.

3. The invention defined in claim 2 wherein the valve directs oil to the inlet area of the strainer element when the pressure is approximately 5 pounds per square inch of vacuum.

4. The invention defined in claim 2 wherein the valve directs oil to the inlet area of the filtering element when the pressure is below 5 pounds per square inch of vacuum.

5. The invention defined in claim 1 wherein the filtering element is a generally cylindrical sleeve with a hollow central bore, said bore having opposite first and second end portions with the first end portion serving as the oil outlet area of the filtering element.

6. The invention defined in claim 5 wherein the strainer element is a generally cylindrical sleeve having a hollow central bore, said bore having one end portion which serves as its oil inlet area.

7. The invention defined in claim 6 wherein the bypass valve is at least partially received within the oil inlet area of the strainer element.

8. The invention defined in claim 7 wherein the bypass valve is completely received within the inlet area of the strainer element.

\* \* \* \* \*